US008565585B2

(12) United States Patent
Thudor et al.

(10) Patent No.: US 8,565,585 B2
(45) Date of Patent: Oct. 22, 2013

(54) REPRODUCTION DEVICE AND METHOD FOR OPERATING THE SAME

(75) Inventors: Franck Thudor, Rennes (FR); Ingrid Autier, Domloup (FR); Claire-Hélène Demarty, Montreuil le Gast (FR)

(73) Assignee: Thomson Licensing, Boulogne, Billancourt (FR)

( * ) Notice: Subject to any disclaimer, the term of this patent is extended or adjusted under 35 U.S.C. 154(b) by 0 days.

(21) Appl. No.: 13/531,645

(22) Filed: Jun. 25, 2012

(65) Prior Publication Data

US 2012/0328262 A1      Dec. 27, 2012

(30) Foreign Application Priority Data

Jun. 24, 2011   (EP) .................................... 11305808

(51) Int. Cl.
*G11B 27/00*    (2006.01)
*H04N 5/93*     (2006.01)
*H04N 9/80*     (2006.01)
*H04N 5/92*     (2006.01)

(52) U.S. Cl.
USPC ........... 386/282; 386/239; 386/240; 386/278; 386/326; 386/353

(58) Field of Classification Search
USPC .................. 386/239, 240, 278, 282, 326, 353
See application file for complete search history.

(56) References Cited

U.S. PATENT DOCUMENTS

| | | | |
|---|---|---|---|
| 2005/0100308 A1* | 5/2005 | Moteki | 386/4 |
| 2005/0246740 A1* | 11/2005 | Teraci et al. | 725/45 |
| 2008/0016089 A1 | 1/2008 | Nishiyama | |
| 2008/0092168 A1* | 4/2008 | Logan et al. | 725/44 |
| 2009/0080930 A1* | 3/2009 | Shinotsuka et al. | 399/81 |
| 2009/0232472 A1* | 9/2009 | Pleiman | 386/83 |
| 2010/0070510 A1* | 3/2010 | Agarwal et al. | 707/748 |

FOREIGN PATENT DOCUMENTS

| | | |
|---|---|---|
| EP | 1113442 | 7/2001 |
| EP | 1530216 | 5/2005 |

OTHER PUBLICATIONS

European Search Report dated Nov. 18, 2011.

* cited by examiner

*Primary Examiner* — Daquan Zhao
(74) *Attorney, Agent, or Firm* — Jeffrey D. Carter

(57) ABSTRACT

The reproduction device is for displaying video information comprising a plurality of chapters. The reproduction device comprises a control unit which is configured to initiate a display of a chapter menu having selectable menu items. Further, the control unit is configured to initiate a reproduction of a chapter of the video information upon selection of the dedicated menu item. The reproduction device is configured to generate attributes of the chapters which are indicative to a respective one of the chapters and to generate a display diagram of the attributes. This diagram may be displayed in the chapter menu.

15 Claims, 3 Drawing Sheets

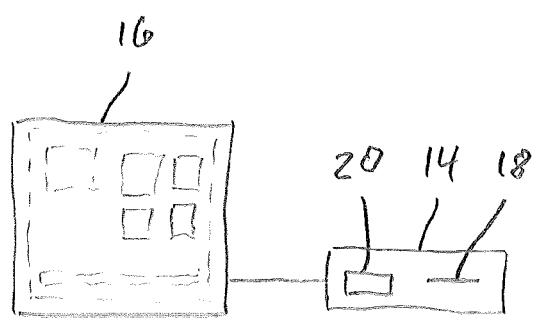

REPRODUCTION DEVICE AND METHOD FOR OPERATING THE SAME

This application claims the benefit, under 35 U.S.C. §119 of EP Patent Application 11305808.5, filed 4 Jun. 2011.

FIELD OF THE INVENTION

The invention relates to a reproduction device for display of video information and to a method of operating the reproduction device.

BACKGROUND

Reproduction devices like DVD- or Blu-ray-players provide a user interface for navigation in the video information that is available for reproduction. These user interfaces are widely known from DVD navigation menus that typically comprise a chapter menu for selecting a certain chapter or video sequence of the DVD. Often, these chapter menus provide a more or less significant thumbnail for each scene or chapter. This may be a key frame, e.g. the first frame of a chapter or a short video sequence. The user may select the corresponding chapter of the DVD by navigating and selecting, e.g. clicking, the thumbnail. Subsequently, the reproduction device, e.g. the DVD-player, may cause a display device to reproduce the video content of the respective chapter.

FIG. 1 is a simplified screenshot showing a typical DVD chapter menu according to the prior art. A menu button 2 allows the user to jump back to the DVD main menu, a forward button 4 and a backwards button 6 will allow the user to switch the menu items 81 . . . 84 forwards and backwards. Each menu item 81 . . . 84 represents a chapter of the DVD. The letters A to D schematically represent the image content of the thumbnail. Further, each menu item 81 . . . 84 comprises a chapter number ranging from 1 to 4 that is indicating the chronology of the chapters.

However, the information of the chapter menu may be not sufficient for a user who desires a personal and fast navigation. For instance, a user may want to navigate via the chapter menu to a certain time reference of the video. Perhaps he or she has already watched the beginning of a movie but has been obliged to stop it. Now, the user gets back to this movie later on and wants to resume the movie without re-watching it right from the beginning. Another scenario is a user who directly wants to access a specific scene of a movie. This may be a scene that he or she watched some time ago. However, the user does not exactly remember the place or time of the desired scene. Another user may want to select a certain song in a concert video or a certain well-known scene of a movie. Typically, the user has to search the movie in fast forward mode which may be an unpleasant experience.

SUMMARY

It is an object of the invention to provide a reproduction device and a method for operating the same providing an advanced chapter selection menu.

According to an aspect of the invention, a method of operating a reproduction device is provided. The reproduction device may be a Blu-ray-, DVD- or hard disc player. However, the method of operating a reproduction device is not limited to certain video formats. The reproduction device may comprise a display, e.g. a flat screen or a projector. However, the reproduction device may be an external device, too, e.g. a DVD- or Blu-ray player or a set-top box. The reproduction device will be coupled to a suitable display device for display of video information.

The video information may comprise a plurality of chapters. Within the context of this specification, a "chapter" may be a chapter of a movie. However, a "chapter" may be a sequence or a section of video information, too. For instance, the video clips of a concert video or a video take pertaining to a certain topic or place of a self made holiday video may be a chapter, too.

A chapter menu having a plurality of user selectable menu items may be displayed. Each menu item may comprise a reproduction of at least one frame of a chapter. In other words, the menu item may be a significant frame of the chapter or a short video sequence of the respective chapter. The menu item may be dedicated to the respective chapter of the video information. Upon selection of the dedicated menu item, a reproduction of the chapter of the video information is started.

Attributes of the chapters that are indicative to a respective one of the chapters may be generated. Within the context of this specification, an "attribute" of a chapter refers to the video content of chapter. An "attribute" of a chapter may be a name of a person that is visible in the respective chapter. Further attributes may be the place or time of the video exposure, e.g. Christmas 2008, Paris.

According to an aspect of the invention, a display diagram of these attributes may be generated. The display diagram may be displayed in the chapter menu. The generation of the display diagram may be based on the results of specific algorithms, e.g. for face recognition. Advantageously, the method according to aspects of the invention provides further information, namely the attributes of the respective chapters in the chapter menu and therefore improves the user comfort.

In another aspect of the invention, the generation of attributes of the chapters comprises the determination of a length of time of the respective chapters. Further, a graphic timeline diagram indicating a chronology of the chapters may be generated. The graphic timeline which may be a graphic diagram, e.g. a vertical-bar chart, may be inserted in the chapter menu. If the user selects a menu item, i.e. a specific chapter, the corresponding part of the bar chart representing the time duration of the chapter may be highlighted or optically emphasized. Preferably, the length of a section that represents a certain chapter in the bar chart may correspond to the time duration of the assigned chapter. In other words, long chapters will appear as wide bars while short-timed chapters will appear as short bars.

According to an embodiment of the invention, the generation of attributes may comprise the analysis of the video content of a respective chapter. Preferably, the video content is analyzed with respect to a level of violence or with respect to information about an identity of an actor or actress playing in the respective chapter. This additional information, i.e. the display diagram representing these attributes, may be inserted in the menu item that is dedicated to the respective chapter. Advantageously, the user is provided with additional information about a level of violence in the respective chapters or about the participation of a specific actor or actress taking part in the screenplay of the respective chapter. This feature in the chapter menu increases the user comfort.

According to another aspect of the invention, the determined levels of violence of the respective chapters may be normalized. Further, these normalized levels of violence may be displayed as a display diagram, e.g. a vertical bar chart, in the chapter menu. The user may evaluate whether the respective chapter, within the context of the complete video information, e.g. a complete movie, is a violent chapter or a harmless chapter that e.g. may be suitable for children.

According to further aspects of the invention, the user may select certain attributes of the video information and may take them as a basis for his or her chapter selection. Accordingly, a plurality of generated attributes may be categorized. A selection box comprising a plurality of menu items, wherein each menu item may represent a category of attributes, may be displayed in a menu selection box in the chapter menu. Upon reception of a user command that is indicative to the selection of at least one of the menu items, the corresponding display diagram or diagrams of the selected attributes may be displayed in the chapter menu.

In another aspect of the invention, a reproduction device is provided. This reproduction device is configured to display video information comprising a plurality of chapters. A reproduction device, within the context of this specification, may be a DVD-, Blu-ray- or hard disk player. It may comprise a display device like a flat screen or a projector. Further, a reproduction device may be an external player or set-top box that is configured to provide a signal to a display device for reproduction of video information or for display of a chapter menu. The reproduction device according to aspects of the invention may comprise a control unit that is configured to initiate a display of a chapter menu. This chapter menu may have a plurality of user selectable menu items wherein each menu item may comprise a reproduction of at least one frame of a chapter of the video information. The menu item may be dedicated to the respective chapter. The reproduction device and the control unit, respectively, is configured to initiate a reproduction of the chapter upon selection of the dedicated menu item. Further, the control unit may be configured to generate attributes of the chapters wherein the attributes are indicative to a respective one of the chapters. Further, a display diagram of the attributes may be generated by the control unit. The display diagram in the chapter menu may be initiated by the reproduction device.

Same or similar advantages that have already been mentioned with respect to the method according to aspects of the invention also apply to the reproduction device according to aspects of the invention.

BRIEF DESCRIPTION OF DRAWINGS

Further objects of the invention will ensue from the following description of example embodiments of the invention with reference to the accompanying drawings, wherein FIGS. 2 to 4 are simplified screenshots of chapter menus generated by a reproduction device according to embodiments of the invention and FIG. 5 is a simplified view to a reproduction system comprising a reproduction device that is coupled to a display device.

DETAILED DESCRIPTION OF EXAMPLE EMBODIMENTS

Figure 1:
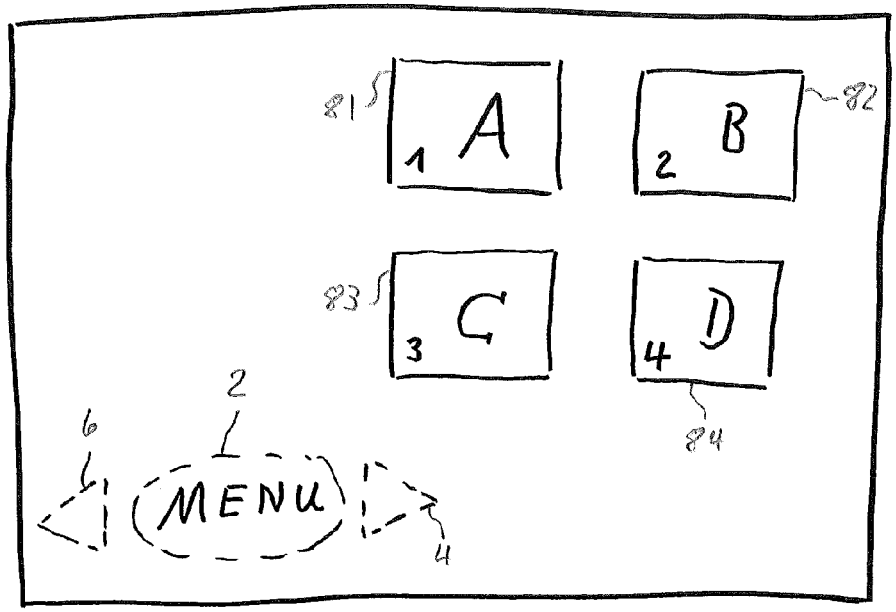
FIG. 1 is a simplified screenshot of a chapter menu according to the prior art.
Figure 2:
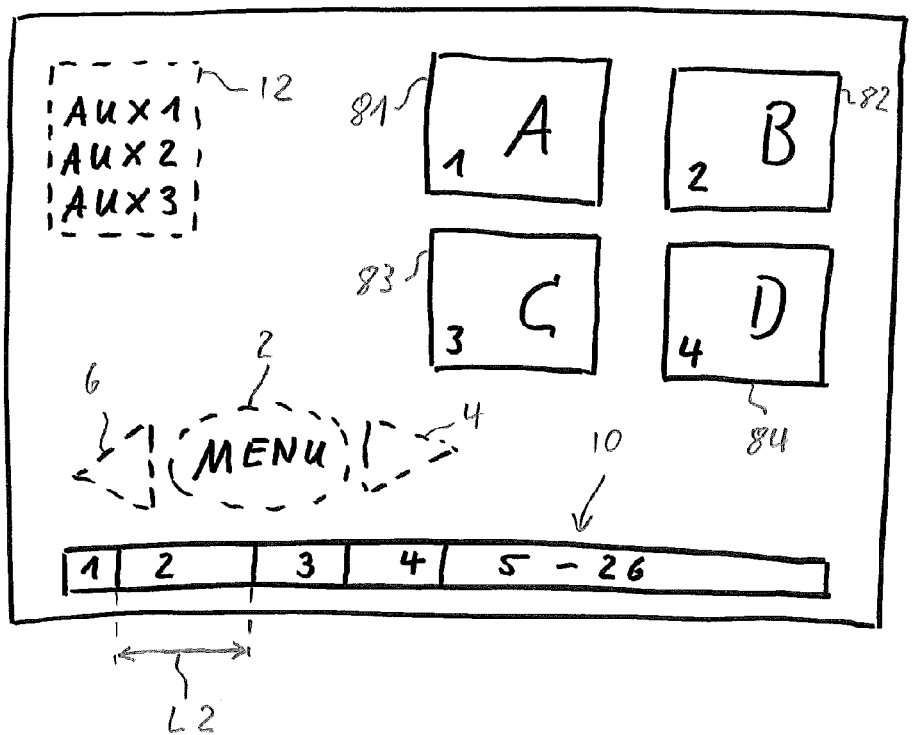

FIG. 2 is a simplified screenshot of a display device, e.g. a flat screen which is coupled to a reproduction device for display of video information, according to an embodiment of the invention. The screenshot shows a chapter menu comprising a main menu button 2 allowing a user to switch back to the main menu, e.g. a main DVD menu. Further, the chapter menu comprises a plurality of menu items 81 . . . 84. Left and right arrow buttons 6, 4 allow a user to select different menu items 81 . . . 84 that are dedicated to different chapters of a video content, e.g. a DVD-movie. By way of an example, the first four chapters are represented by the respective menu items 81 . . . 84. A click to the right button 4 will switch the chapter menu to the next chapters, namely the fifth to eighth chapter. The menu items 81 . . . 84 comprise a reproduction of at least one frame of the dedicated chapter. A short video sequence taken from the respective chapter may be displayed, too. The video content is schematically illustrated by letters A to D. Further, the menu items 81 . . . 84 comprise a chapter number in the lower left corner. This chapter number indicates a position of the chapter in the chronology of chapters in the video information.

Additional information is presented to the user at the bottom of the chapter menu. A timeline 10 represents attributes of the chapters. Not only does the timeline 10 indicate a chronology of the chapters but also the horizontal length of the chapter bar (as it is exemplarily shown by the length L2 for the second chapter) corresponds to a length of time of the respective chapter. Preferably, if the user selects a certain menu item, e.g. chapter 2, the corresponding chapter bar of the timeline 10 may be highlighted. Before selecting a certain chapter of, e.g., a DVD, the user is provided additional information about a position in time of this chapter within the chronology of chapters. Further, the user may estimate a length in time of this chapter.

The user may further select which additional information he or she likes to see in the chapter menu. For this purpose, there may be a menu selection box 12. This menu selection box 12 comprises further menu items AUX1 . . . AUX3. The menu items AUX1 . . . AUX3 represent categories of attributes that have been determined for a respective one of the chapters. By way of an example, AUX 1 may be the attribute "timeline" and by selecting this menu item in the selection box 12, the timeline 10 will be displayed in the chapter menu.

Figure 3:
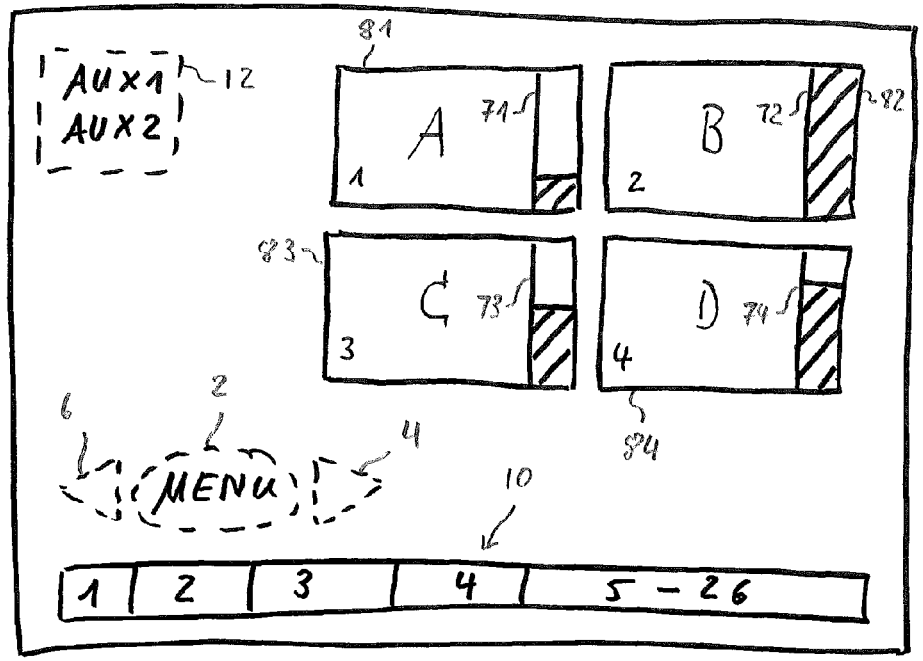

FIG. 3 is a further simplified screenshot of a chapter menu that has been generated by a reproduction device and a method according to another embodiment of the invention, respectively. The chapter menu of FIG. 3 is comparable to that of FIG. 2 despite of the fact, the menu selection box 12 comprises only two categories AUX 1 and AUX 2 and the menu items 81 . . . 84 comprise additional information about a level of violence in the respective chapters. For instance, the level of violence may be the second category AUX 2 that may be selected by the user via the menu selection box 12. A specific algorithm may be run on each chapter to detect violent scenes and to extract the associated frames. According to an aspect of the invention, the level of violence in the respective chapters may be normalized. In other words, the level of violence in a certain chapter is determined with reference to the levels of violence in the further chapters of the video information. Absolute values of the level of violence may be displayed, too. The level of violence may be indicated by vertical bar charts 71 . . . 74 which are preferably integrated in the menu items 81 . . . 84. A high bar indicates a high level of violence and a low bar indicates a low level of violence. For instance, chapter 2 has a high level of violence and chapter 1 has a low level of violence. The bar charts 71 . . . 74 may also be colored, wherein a certain color, e.g. red, indicates a high level of violence.

Figure 4:
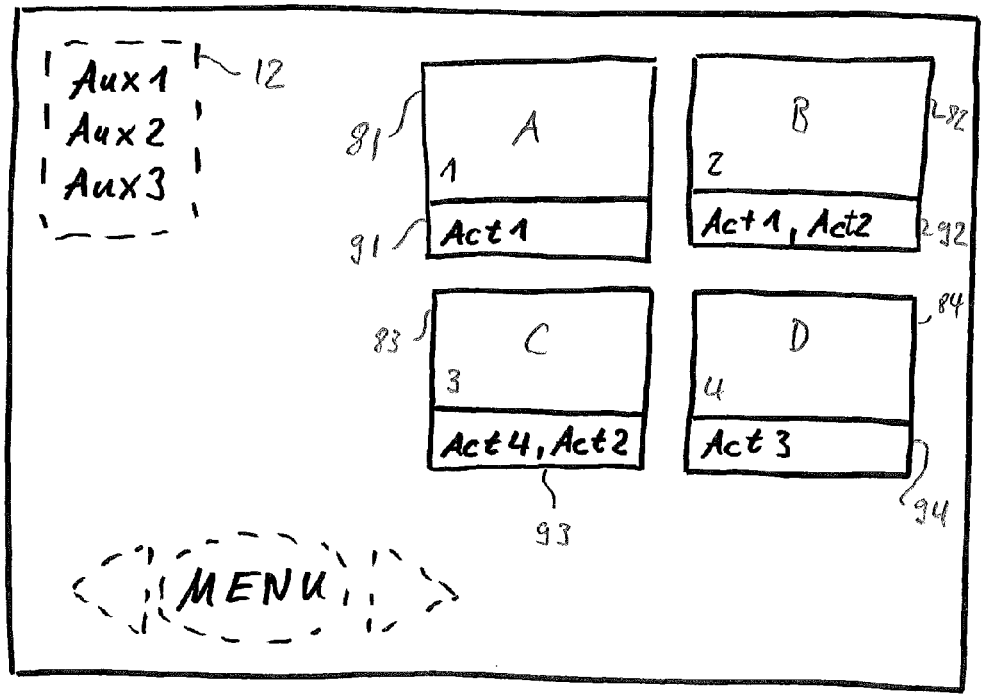

FIG. 4 is another simplified screenshot showing a chapter menu that may be generated by a reproduction device and a method according to another embodiment of the invention, respectively. In this chapter menu, the timeline has been omitted. Also a level of violence is assumed to be not of interest. However, the user may have selected the category "actor", which may be menu item AUX 3. Accordingly, it has been determined which actor or actress is present in a respective one of the chapters. This may be performed by running a special algorithm at the video information of a respective chapter, e.g. an algorithm for face recognition. Accordingly, the menu items 81 . . . 84 comprise additional information, namely a text field 91 . . . 94. Each text field 91 . . . 94 represents the display diagram of the attribute category "actor". In the chapter menu of FIG. 4, actor 1 is the only actor that is present in the first chapter. In the second chapter, actor 1 and 2 are playing. Instead of a text listing that indicates the names of the actors or actresses, a photo register or any other graphic icon representing the respective person may be integrated in the chapter menu and the chapter items 81 . . . 84, respectively.

Attributes of the chapters may be generated by the author of the video information, too. For self recorded or self edited video, e.g. the UGC field that is available during editing a DVD, may be used for storing attributes of the chapters. The same applies to picture selections and recorded movies. Such attributes may be a type of action that has been recorded (e.g.: skiing, beach, countryside, . . . ), people involved in the recorded scene (e.g.: children, family, friends, . . . ) or the topic of the respective chapter of the DVD (e.g.: birthday, Christmas, . . . ). All kind of movie sequences may be personalized by setting attributes or by generating them from the video information of the respective chapters. If the attributes are generated during production or editing the video content, the step of generating the attributes for the chapter menu is performed by reading the respective attribute field of the video. Even a certain cut or selection of video on demand sequences may be chaptered. A further option for personalized video information may be a storyboard video sequence that may be personalized by assigning attributes to the chapters thereof.

FIG. 5 is a simplified view to reproduction system comprising a reproduction device 14 that is coupled to a display device 16. The reproduction device 14 may be a set-top box, a DVD-player, a Blu-ray player or the like. The display device 16 may be a TFT display, a projector or the like. The display device 16 may display the user menus that have been illustrated as simplified screenshots in FIGS. 2 to 4. The reproduction device 14 may be provided with a storage medium 18, e.g. a Blu-ray disk. Further, the reproduction device 14 comprises a control unit 20.

Although the invention has been described hereinabove with reference to a specific embodiment, it is not limited to this embodiment and no doubt further alternatives will occur to the skilled person that lie within the scope of the invention as claimed.

The invention claimed is:

1. A method of operating a reproduction device for display of video information comprising a plurality of chapters, the method comprising the steps of:
   a) displaying a chapter menu having a plurality of user selectable menu items, wherein each menu item comprises a reproduction of at least one frame of a chapter and is dedicated to the respective chapter,
   b) starting a reproduction of the chapter upon selection of the dedicated menu item, comprising the steps of:
   c) generating attributes of the chapters that are indicative to a respective one of the chapters,
   d) generating a display diagram of the attributes, and
   e) categorizing a plurality of generated attributes,
   f) displaying a menu selection box comprising a plurality of box menu items, wherein each box menu item represents a category of attributes,
   g) receiving a user command that is indicative to at least one of the box menu items, and
   h) displaying the display diagram of the selected attribute in the chapter menu.

2. The method according to claim 1, wherein step c) comprises the determination of a length of time of the respective chapters and step d) comprises the generation of a graphic time line diagram indicating a chronology of the chapters.

3. The method according to claim 2, wherein step c) further comprises the step of analyzing the video content of a respective chapter.

4. The method according to claim 3, wherein the video content is analyzed with respect to a level of violence.

5. The method according to claim 4, wherein step d) comprises the step of normalizing the determined levels of violence of the respective chapters and step h) comprises the step of displaying a display diagram of the normalized levels of violence in the user interactive screen.

6. The method according to claim 5, wherein step c) comprises the step of analyzing the chapters with respect to information about an identity of an actor or actress playing in the respective chapter.

7. The method according to claim 3, wherein step c) comprises the step of analyzing the chapters with respect to information about an identity of an actor or actress playing in the respective chapter.

8. The method according to claim 4, wherein step c) comprises the step of analyzing the chapters with respect to information about an identity of an actor or actress playing in the respective chapter.

9. The method according to claim 1, wherein step c) further comprises the step of analyzing the video content of a respective chapter.

10. The method according to claim 9, wherein the video content is analyzed with respect to a level of violence.

11. The method according to claim 10, wherein step d) comprises the step of normalizing the determined levels of violence of the respective chapters and step h) comprises the step of displaying a display diagram of the normalized levels of violence in the user interactive screen.

12. The method according to claim 9, wherein step c) comprises the step of analyzing the chapters with respect to information about an identity of an actor or actress playing in the respective chapter.

13. The method according to claim 1, wherein the display diagram representing attributes of the respective chapter is inserted in the menu item that is dedicated to the respective chapter.

14. A reproduction device for display of video information comprising a plurality of chapters, the reproduction device comprising a control unit that is configured to:
   a) initiate a display of a chapter menu having a plurality of user selectable menu items, wherein each menu item comprises a reproduction of at least one frame of a chapter and is dedicated to the respective chapter,
   b) initiate a reproduction of the chapter upon selection of the dedicated menu item, wherein the control unit that is further configured to:
   c) generate attributes of the chapters that are indicative to a respective one of the chapters,
   d) generate a display diagram of the attributes, and
   e) categorize a plurality of generated attributes,
   f) initiate a display of a menu selection box comprising a plurality of box menu items, wherein each box menu item represents a category of attributes,
   g) receive a user command that is indicative to at least one of the box menu items, and
   h) initiate the display diagram of the selected attribute in the chapter menu.

15. The reproduction device according to claim 14, wherein the reproduction device is a set-top box that is configured to cause a display device to display a chapter menu and to reproduce the chapter of the video information upon selection of the dedicated menu item.

* * * * *